(12) United States Patent
Huang et al.

(10) Patent No.: US 7,903,294 B2
(45) Date of Patent: Mar. 8, 2011

(54) LIGHT-PATH DEVICE OF CURVED-SURFACE OPTICAL ELEMENT

(76) Inventors: Yin-Chun Huang, Hsinchu (TW); Chih-Wen Huang, HsinChu (TW)

( * ) Notice: Subject to any disclaimer, the term of this patent is extended or adjusted under 35 U.S.C. 154(b) by 2289 days.

(21) Appl. No.: 10/373,279

(22) Filed: Feb. 24, 2003

(65) Prior Publication Data
US 2004/0001237 A1   Jan. 1, 2004

(30) Foreign Application Priority Data

Jun. 28, 2002   (TW) .............................. 91114251 A (51) Int. Cl.
*H04N 1/04* (2006.01)
(52) U.S. Cl. .......... 358/474; 358/483; 358/475; 358/497
(58) Field of Classification Search .................. 358/509, 358/474, 199, 408, 475, 482, 483, 505, 506, 358/487, 497; 362/3; 359/867, 197, 676, 359/672, 648; 250/208.1, 234–236, 216
See application file for complete search history.

(56) References Cited

U.S. PATENT DOCUMENTS

| | | | | |
|---|---|---|---|---|
| 5,081,346 A * | 1/1992 | Narabu et al. | ............... | 250/208.1 |
| 6,473,248 B1 * | 10/2002 | Nakanishi et al. | ............ | 359/824 |
| 6,507,444 B2 * | 1/2003 | Hayashide et al. | ........... | 359/720 |
| 6,577,453 B2 * | 6/2003 | Kimura | .......................... | 359/730 |
| 6,628,432 B1 * | 9/2003 | Oshima et al. | ................ | 358/474 |
| 6,801,345 B1 * | 10/2004 | Imamura | ....................... | 358/509 |
| 7,518,758 B2 * | 4/2009 | Chien | ........................... | 358/474 |
| 2003/0147109 A1 * | 8/2003 | Chien | ........................... | 358/505 |
| 2003/0164995 A1 * | 9/2003 | Hsu et al. | ...................... | 358/509 |
| 2003/0227655 A1 * | 12/2003 | Chen et al. | .................... | 358/474 |
| 2007/0146815 A1 * | 6/2007 | Chen | ............................ | 358/474 |

FOREIGN PATENT DOCUMENTS

| JP | 04313948 A | * | 11/1992 |
|---|---|---|---|
| JP | 05136945 A | * | 6/1993 |

* cited by examiner

Primary Examiner — Cheukfan Lee
(74) Attorney, Agent, or Firm — Stolowitz Ford Cowger LLP (57) ABSTRACT

Embodiments of the invention disclose a light-path device of an optical scanner that includes a curved-surface optical element and a light-path module. The arrangement between the curved-surface optical element and the light-path module may be designed such that the length of a light-path route through the light-path device may be adjusted to accommodate various sized objects to be scanned and physics characteristics of the photoelectric conversion device included in the scanner to convert the image into an electrical signal.

23 Claims, 7 Drawing Sheets

LIGHT-PATH DEVICE OF CURVED-SURFACE OPTICAL ELEMENT

FIELD OF THE INVENTION

The invention relates to a light-path device of curved-surface optical element, especially to a light-path device that has a curved-surface optical element and is arranged in an optical scanner for adjusting the total light-path length in the light-path device.

BACKGROUND OF THE INVENTION

One of the general application principles of an optical scanner is that a light beam is reflected through a light-path device and formed into an image by a lens and, a charge-coupled device is further applied to convert the light signal into digital signal capable of being memorized and processed by a computer. However, since the limitation of a certain light-path's length is required to form the desired image, the light has to be reflected several times by a plurality of reflection mirrors in the light-path device to effectively reduce its dimension. Therefore, in the light-path device, the number, the size, and the inter-corresponding arrangement and position of the reflection mirrors will decide the light-path route of a light-path device and, in addition, help match with the functions of magnification and reduction of a lens to determine the length of the light-path.

Figure 1:
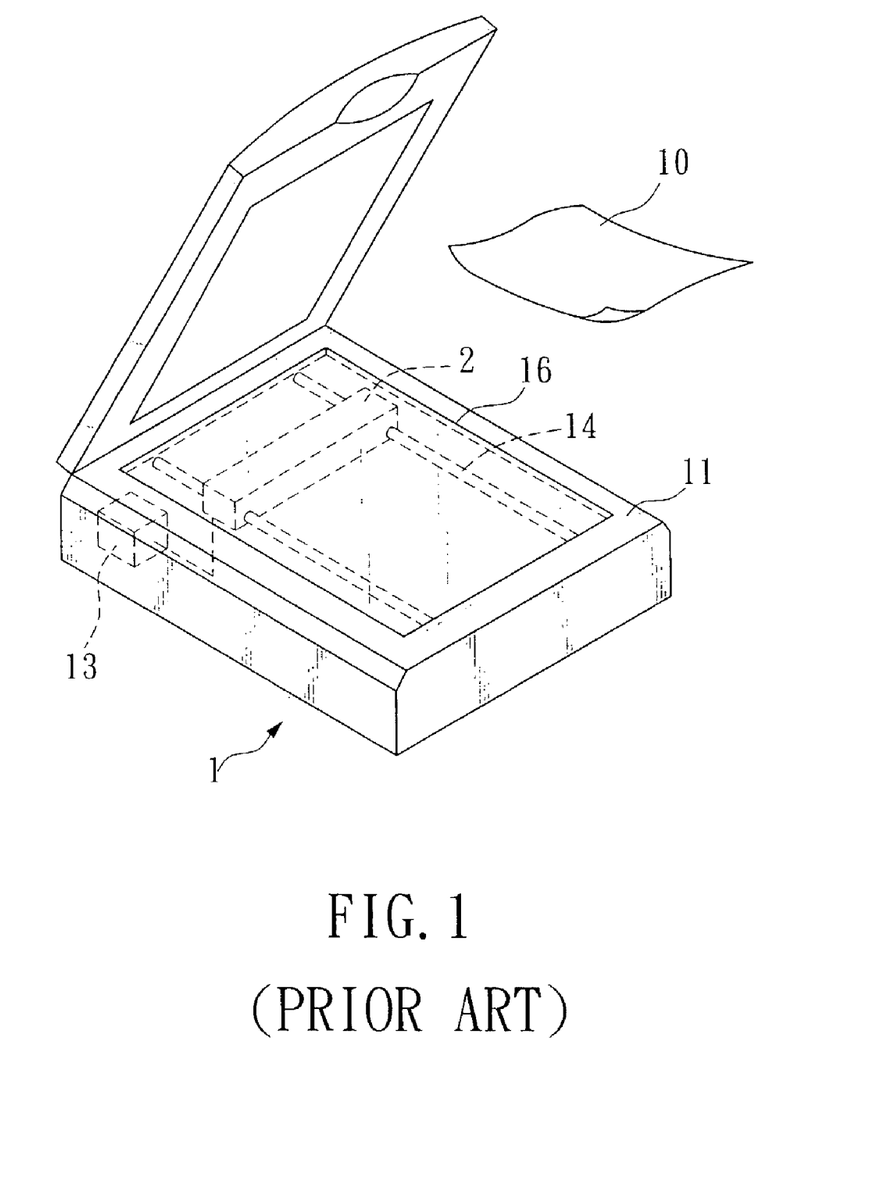
FIG. 1 is a three-dimensional structural illustration for a flatbed optical scanner according to the current prior arts.

Please refer to FIG. 1, which is a three-dimensional structural illustration for a flatbed optical scanner typically seen in the current market. An object supporting glass 16 is arranged on the upper side surface of an outer shell 11 of a scanner 1 for placing a reflective object 10. A light-path device 2 is driven by a driving device 13 for proceeding in a linear motion along the direction of a guiding rod 14 in the hollow outer shell 11, such that an image scanning job is executed on the reflective object 10 placed on the object supporting glass 16.

Figure 2:
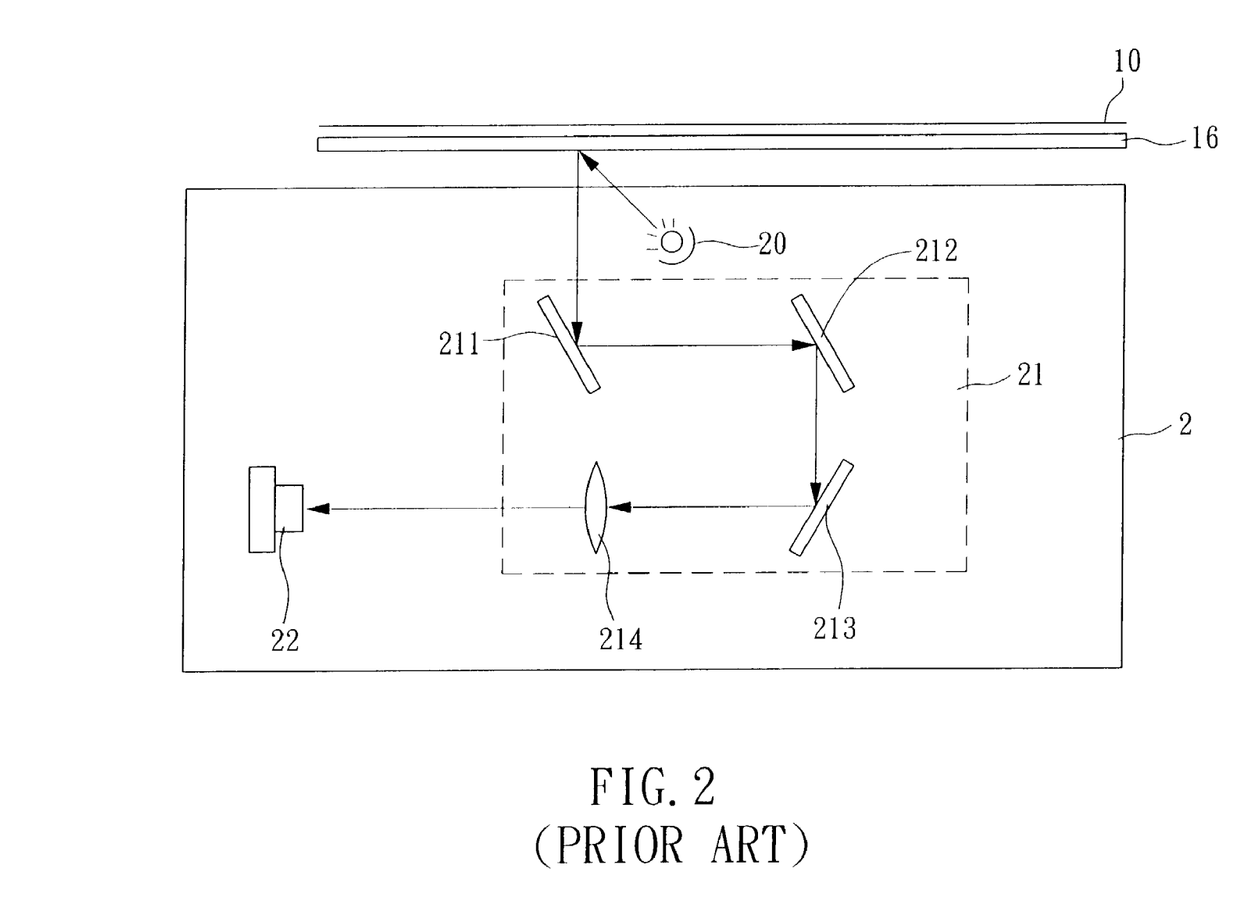
FIG. 2 is an illustration for a light-path route in a flatbed optical scanner according to the current prior arts.

Please refer to FIG. 2, which is an illustration for the light-path route in a flatbed optical scanner according to the current prior art. The route of the light-path is determined by the light-path device 2, which is comprised of light source 20, light-path module 21, and charge-coupled device 22. The light-path module 21 includes three reflection mirrors 211, 212, 213, and a lens 214. The light of the light source 20 penetrates through the object supporting glass 16 irradiates upon the reflective object 10. The light irradiated from the reflective object 10 is then reflected sequentially by the first reflection mirror 211, the second reflection mirror 212, and the third reflection mirror 213, which finally reflects the light to a lens 214, from which the focused light is further irradiated to a charge-coupled device 22.

To reduce an object plane in the prior art described above in order to fit the image of the reflective object 10 on the charge coupled device 22, magnification and reduction functions of the lens may be altered. However, because of the limitations associated with the specification and physics of the lens itself during manufacture and the size of the scanned object itself, the length of the light-path route must be designed to be long enough to fit the image of the entire scanned object 10 on the lens. Hence, improvements in the adjustability of the light-path device in order to adjust the length of the light path is needed.

SUMMARY OF THE INVENTION

In light of the limitations of above prior arts described above, embodiments of the present invention provide an innovative design of light-path device including curved-surface optical element design. One of the main objectives of the invention is to provide a light-path device having a curved-surface, wherein the device is arranged in an optical scanner. Appropriately arranging the inter-relational position of the curved-surfaced light-path device (e.g., a curved-surface optical element) with reflection mirrors or photoelectric conversion devices in the light-path route can allow the length of the light-path route to be adjusted such that different length light-path route will be determined according to the different positions of the curved-surface optical element in the light-path route. Thus, a document is scanned at an appropriate position that is pre-designed without the limitations of the size of the scanned document or the photoelectric conversion device itself.

The invention includes a curved-surface optical element, a light source, a light-path module, a light-focusing device, and a photoelectric conversion device. The light-path module includes a reflection device and a light-focusing device, wherein the reflection device is comprised of a plurality of reflection mirrors, and the light-focusing device may be a lens. The light source provides the light needed in a scanning procedure, and the reflection mirrors sequentially reflect the light penetrating through the transparent supporting glass and reflected from the object to reach a predetermined length of a reflective light path, while the lens may receive the reflective light reflected from the reflection mirrors and focus it into an image. The photoelectric conversion device then receives the light focused as an image by the lens and converts it into an electric signal.

The relation between the system's magnification ratio and the subsystem's magnification ratio is applied such that, in the light-path design of the curved-surface optical element and the light-path of the light-path module, the positions between the curved-surface optical element and the light-path module may determine the value of the system magnification, and hence also determine the needed total length of the light-path route.

In a preferable embodiment, a convex optical element is designed between the object and the light-path module for adjusting the light-path length.

In another preferable embodiment, a concave optical element is designed between the object and the light-path module for adjusting the light-path length.

In a further preferable embodiment, a concave optical element or a convex optical element is designed between the light-path module and the photoelectric conversion device for adjusting the light-path length.

In a further another preferable embodiment, a concave optical element and a convex optical element are respectively designed between the object and the light-path module, and between the light-path module and the photoelectric conversion device for adjusting the light-path lengths.

DETAILED DESCRIPTION OF THE INVENTION

The invention discloses a light-path device (e.g., a curved-surface optical element) arranged in a light-path module, wherein a light-path route is designed and adjusted through the variation of different light-path positions for the curved-surface optical element to focus or disperse the optical image. This ability to design and adjust the light path results in being able to keep the original reflection function of the light-path route, while also providing an innovative technique for changing the length of the entire light-path route to flexibly scan various shaped objects and maintaining the quality of the scanned image.

The principle of the invention is to apply the design of an image magnification ratio (M) in the light-path. The magnification ratio of the image reflected and focused by the reflection mirrors and the lens is matched with the position of the curved-surface optical element for adjusting the magnification ratio, such that the reflection, the focus, and the photoelectric conversion of the image may be properly completed. For the magnification ratio of an ordinary document, the size (Wd) of the surface of the document, the size (We) of the sensing cell of the photoelectric conversion device, and the diffraction limitation of the lens design must be considered, all which may be expressed as following formula:

Magnification=$Q$(image size)/$P$(object size)=$Hi$(image height)/$Ho$(object height)=$(Nc*Wc)/Wd$ Wherein, Nc is the number applied by the sensing cell of the photoelectric conversion device, so the system magnification ratio (M.sub.system) may be designed by a manner of separation system; namely, a formula may be described as the following:

$M$.sub.system=$M1*M2*M3* \ldots Mn$

Wherein, n is the number of the separation system. In other words, the magnification ratio (M.sub.system) of a major system may be designed as the product of the magnification ratios of several separated sub-systems. Thus, aside from the magnification ratio of the lens' object system, the other sub-system's magnification ratio may be adjusted so that the magnification ratio of the major system, and the design of the entire light-path route is further determined. The curved-surface optical element described in embodiments of the invention may be responsible for the ability of adjusting the magnification ratio of the sub-system to further adjust the magnification ratio of the entire major system. Thus, by arranging different positions of the curved-surface optical elements, the functions of the convergence (reduction) or the dispersion (magnification) of the image may be achieved such that the design of the curved-surface optical element builds in flexibility without the limitation posed by the diffraction extremity of the lens itself. Thus, the magnification ratio can be designed as the following:

$M$.sub.system=$M$.sub.lens*$M$.sub.curved-surface optical element

In this way, the adjustment of the light-path route for the reflection, the focus, and the photoelectric conversion of the image by an entire optical scanner is achieved. For convenient description, in the following embodiment, the reflection device (including plural reflection minors) and the lens are regarded as a sub-system M.sub.lens. If the plural reflection mirrors and the lens are assumed as a light-path module, then, this light-path module may be designed correspondingly with the curved-surface optical element, and the light-path modules for different magnification ratios may then be matched correspondingly with the curved-surface optical elements of different magnification ratios.

Figure 3:
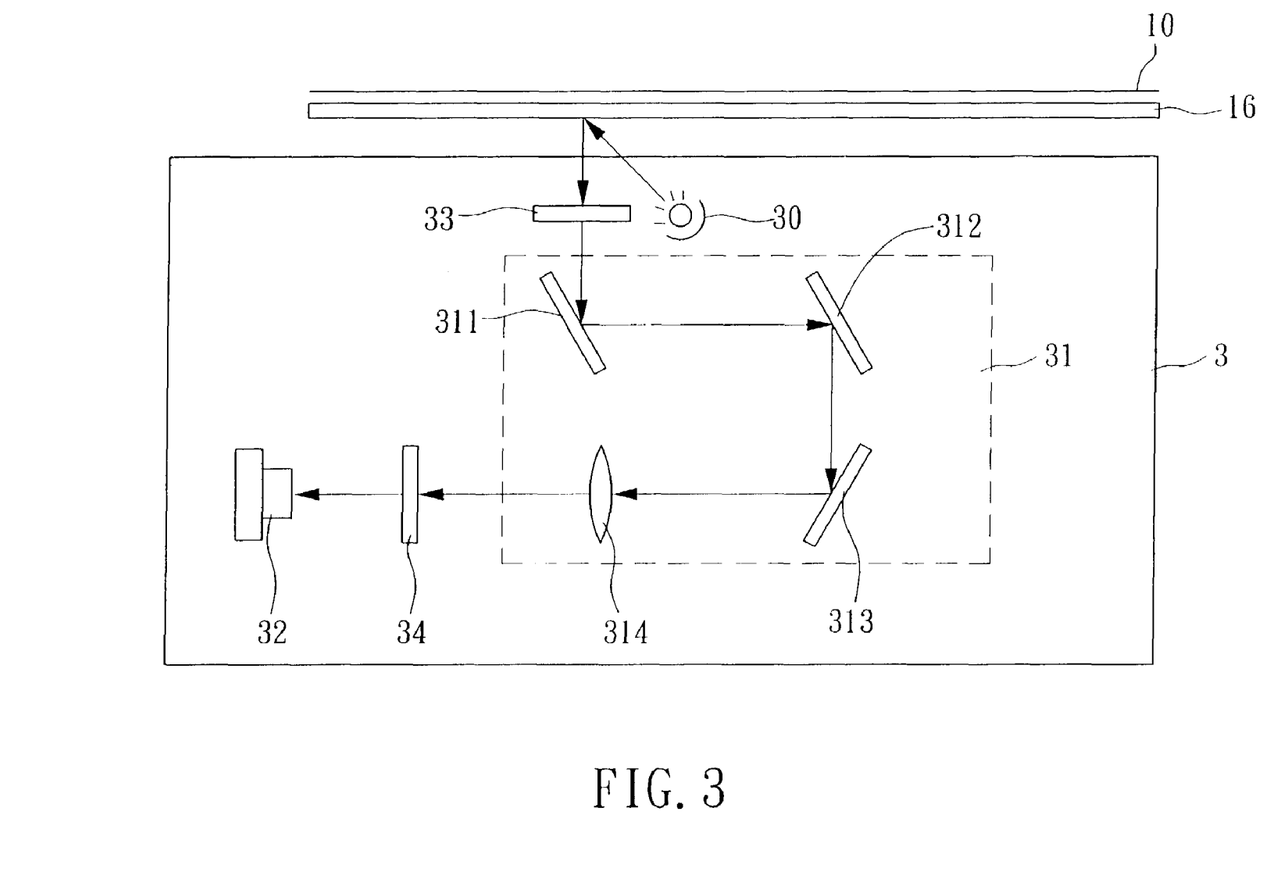
FIG. 3 is a first preferable embodiment according to the invention.

Please refer to FIG. 3, which is a first preferable embodiment according to the invention-curved-surface optical element in the light-path of a scanner, the length of the light-path route in the light-path device of a scanner may be adjusted, wherein the light-path device 3 includes a light-source device (light source 30), a light-path module 31, and a photoelectric conversion device 32 (may be a CCD), where the light-path module 31 further includes a reflection device (comprised of reflection mirrors 311, 312, 313) and a light-focusing device (lens 314). The light source 30, providing a light needed by the scanning procedure, irradiates reflective object 10 through the transparent supporting glass 16. The reflection mirrors 311, 312, 313 sequentially reflect the light reflected from the object 10 placed on the transparent supporting glass 16 to reach a predetermined length of a reflective light-path, while the lens 314, a light-focusing device capable of focusing light into image, receives the light reflected from the reflection mirror 313 and focuses it into an image. The photoelectric conversion device 32 receives the light of the image focused by the lens 314 and converts it into electric signal.

One feature of the first embodiment of the present invention is that a curved-surface optical element 33 is designed to be disposed between the light-path module 31 and the object 10, and/or a curved-surface optical element 34 is designed to be disposed between the light-path module 31 and the photoelectric conversion device 32. Hence, one or two of the curved-surface optical elements 33, 34 may be chosen, such that a scanner design has a desired system magnification ratio defined by M.sub.system=M.sub.lens*M.sub.curved-surface optical element. The light-path module 31 may be designed as a sub-system containing the lens 314, and the curved-surface optical element 33 and the curved-surface optical element 34 may be designed as another sub-system (only one of the curved-surface optical element 33 or the curved-surface optical element 34 is applied in this instance). These designs may be governed by the following: M.sub.system=M.sub.light-path module*M.sub.curved-surface optical element 33 or M.sub.system=M.sub.light-path module*M.sub.curved-surface optical element 34, wherein the M.sub.light-path module is the M.sub.lens described above. In the instance when the curved-surface optical element 33 is regarded as a first sub-system and the curved-surface optical element 34 is regarded a second sub-system (i.e., the curved-surface optical element 33 and the curved-surface optical element 34 are both included in the design, the following formula is may be used in the design: M.sub.system=M.sub.light-path module*M.sub.curved-surface optical element 33*M.sub.curved-surface optical element 34, wherein the M.sub.light-path module is the M.sub.lens described above.

Figure 4:
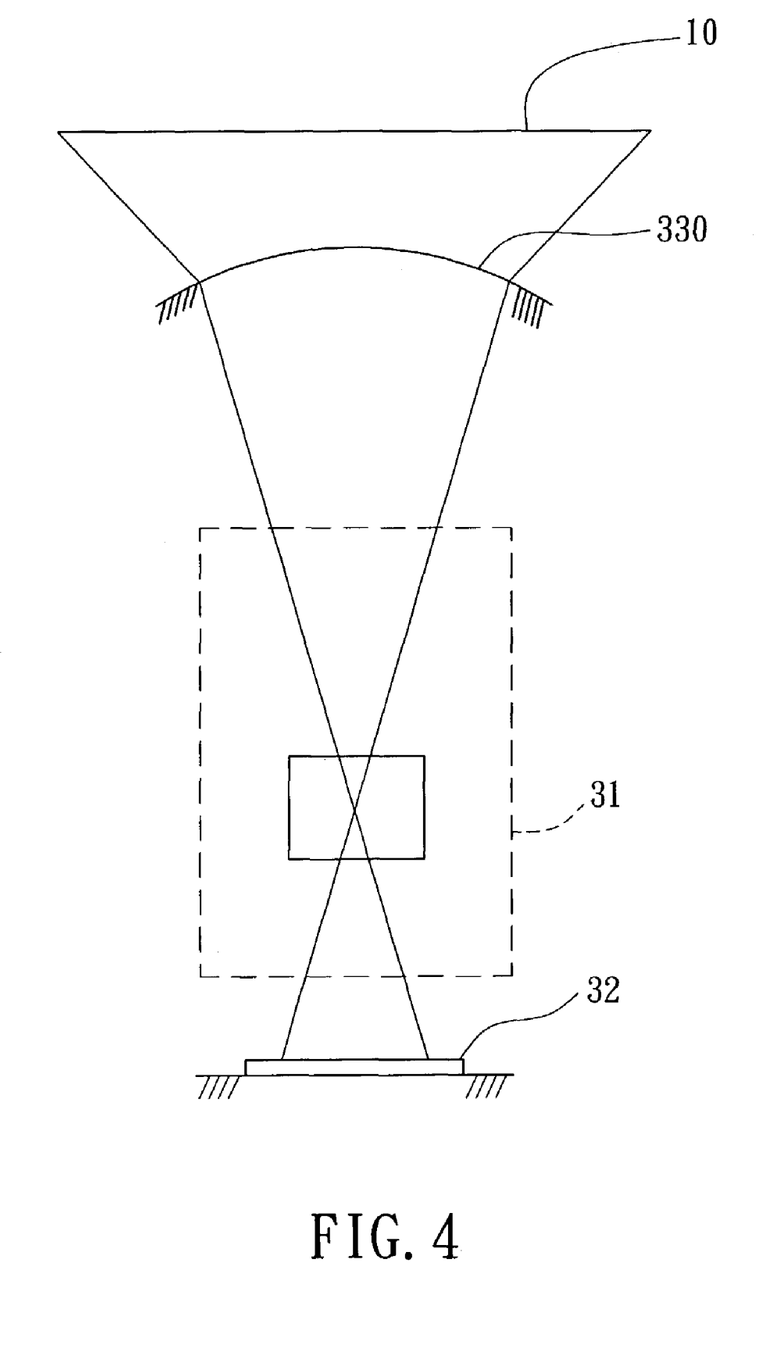
FIG. 4 is a second preferable embodiment according to the invention.

Please refer to FIG. 4, which is the second preferable embodiment according to the invention. As shown in FIG. 4, this embodiment specifies a design where the curved-surface optical element 330 is disposed between the object 10 and the light-path module 31. Here, the light progressing from the object 10 toward the light-path module 31 will be focused (shrunk) into the light-path module 31. In other words, through the curved-surface optical element 330, the image may be irradiated into the light-path module 31 within a shorter light-path route, so the length of the light-path will be shorter in comparison to conventional designs where there is no curved-surface optical element 330. In other words, in a situation where the size of the object 10 is not changed, the curved-surface optical element 330 may adjust the length of the light-path route between the object 10 and the light-path module 31, wherein the curved-surface optical element 330 is a convex optical element (i.e., its convex surface is toward the object 10).

Figure 5:
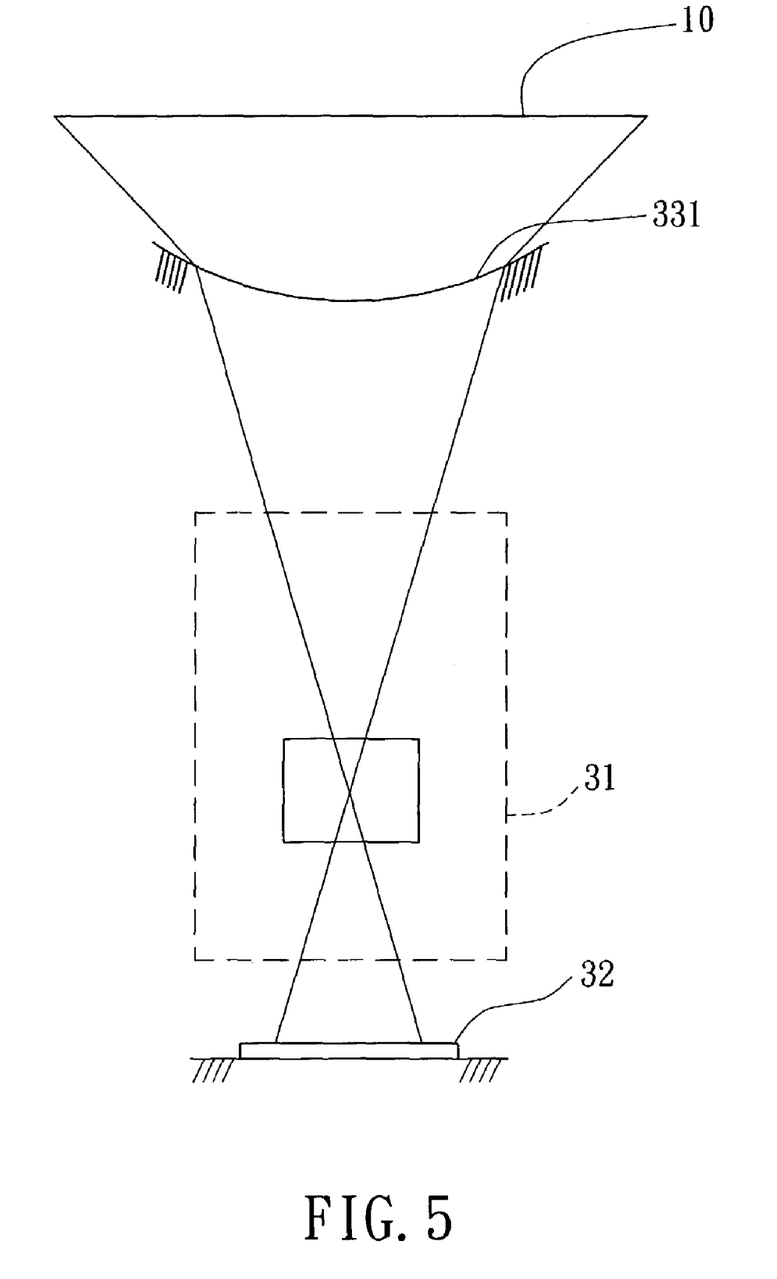
FIG. 5 is a third preferable embodiment according to the invention.

Please refer to FIG. 5, which is a third preferable embodiment according to the invention. As shown in FIG. 5, this embodiment is roughly similar to that shown in FIG. 4. However, the curved-surface optical element 331 is a concave optical element (i.e., its concave surface is toward the object 10). Therefore, either a convex optical element or a concave optical element may be used as curved-surface optical element 330, 331 in this embodiment of the invention. By changing the position of the curved-surface optical element in the light-path route-the light-path length between the object 10 and the light-path module 31 may be changed. Of course, the position in either case of the curved-surface optical element 330 in FIG. 4 or the curved-surface optical element 331 in FIG. 5 may be designed according to the light-path length of actual need. The light-path route summarized from FIG. 3 through FIG. 5 is described sequentially as the following: light-source device (light source 30)=>object 10=>curved-surface optical element (curved-surface optical element 330 or curved-surface optical element 331)=>reflection device (reflection mirrors 311, 312, 313)=>light-focusing device (lens 314)=>photoelectric conversion device 32 (CCD).

Figure 6:
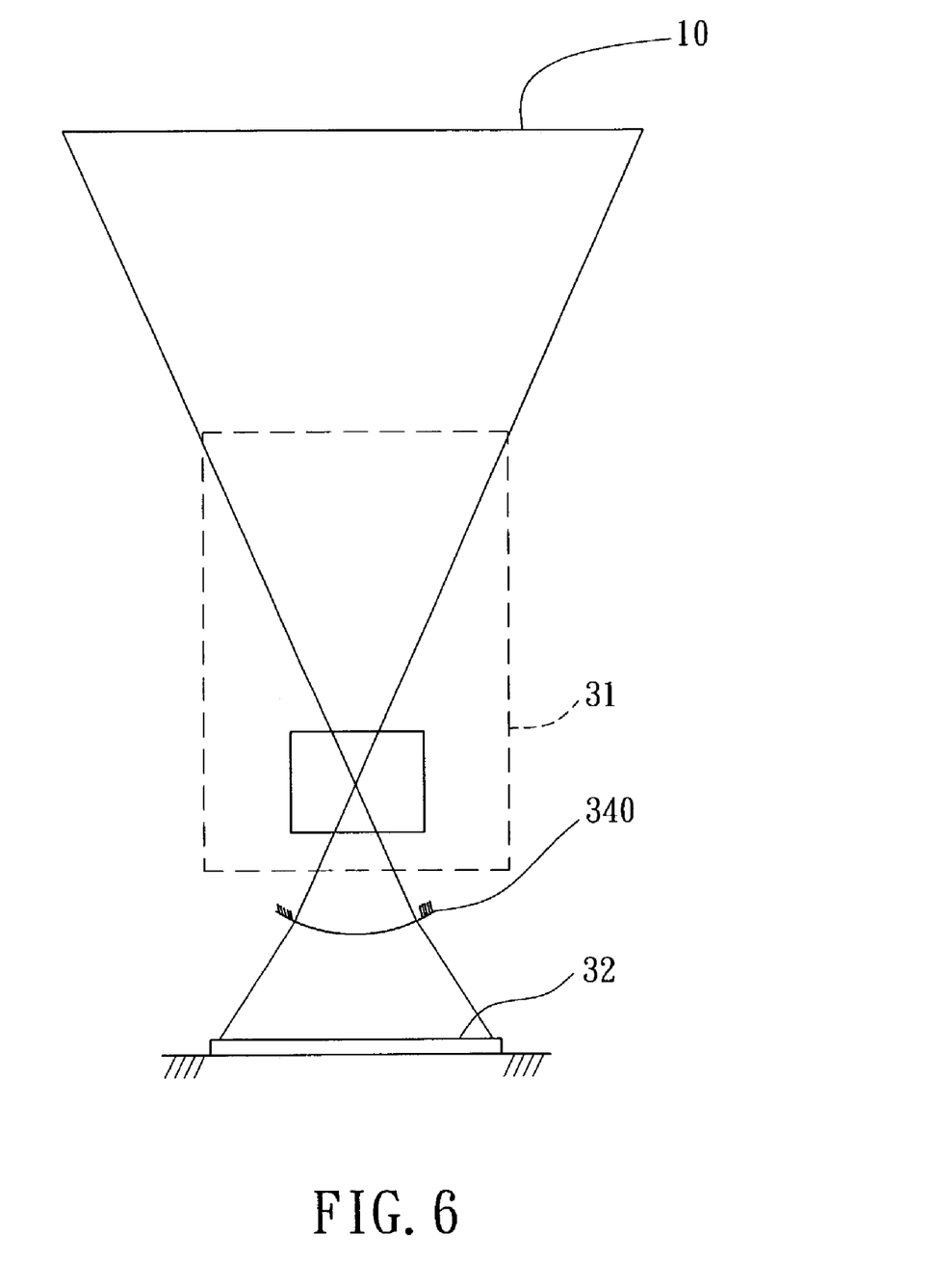
FIG. 6 is a fourth preferable embodiment according to the invention.

Please refer to FIG. 6, which is the fourth preferable embodiment of the invention. As shown in FIG. 6, this embodiment specifies a curved-surface optical element 340 be disposed between the light-path module 31 and the photoelectric conversion device 32. Here, the light progressing from the light-path module 31 toward the photoelectric conversion device 32 will be dispersed (magnified) by the curved-surface optical element 340 on the path to the photoelectric conversion device 32. Hence, the light-path length will be shortened in comparison with conventional designs where there is no curved-surface optical element 340. Namely, in situations where the size of the photoelectric conversion device 32 is not changed, the curved-surface optical element 340 may adjust the length of the light-path route from the light-path module 31 to the photoelectric conversion device 32. In other words, the curved-surface optical element 340 may irradiate the image into the photoelectric conversion device 32 with a shorter light-path length such that the dispersed image will be processed by a photoelectric conversion within the photoelectric conversion device 32. By changing the position of the curved-surface optical element 340 in the light-path route, the light-path length between the photoelectric conversion device 32 and the light-path module 31 may be changed. The curved-surface optical element 340 may be a convex optical element or a concave optical element. The light-path route summarized from FIG. and FIG. 6 is described sequentially as the following: light-source device (light source 30)=>object 10=>reflection device (reflection mirrors 311, 312, 313)=>light-focusing device (lens 314)=>curved-surface optical element (curved-surface optical element 340)=>photoelectric conversion device 32 (CCD).

Figure 7:
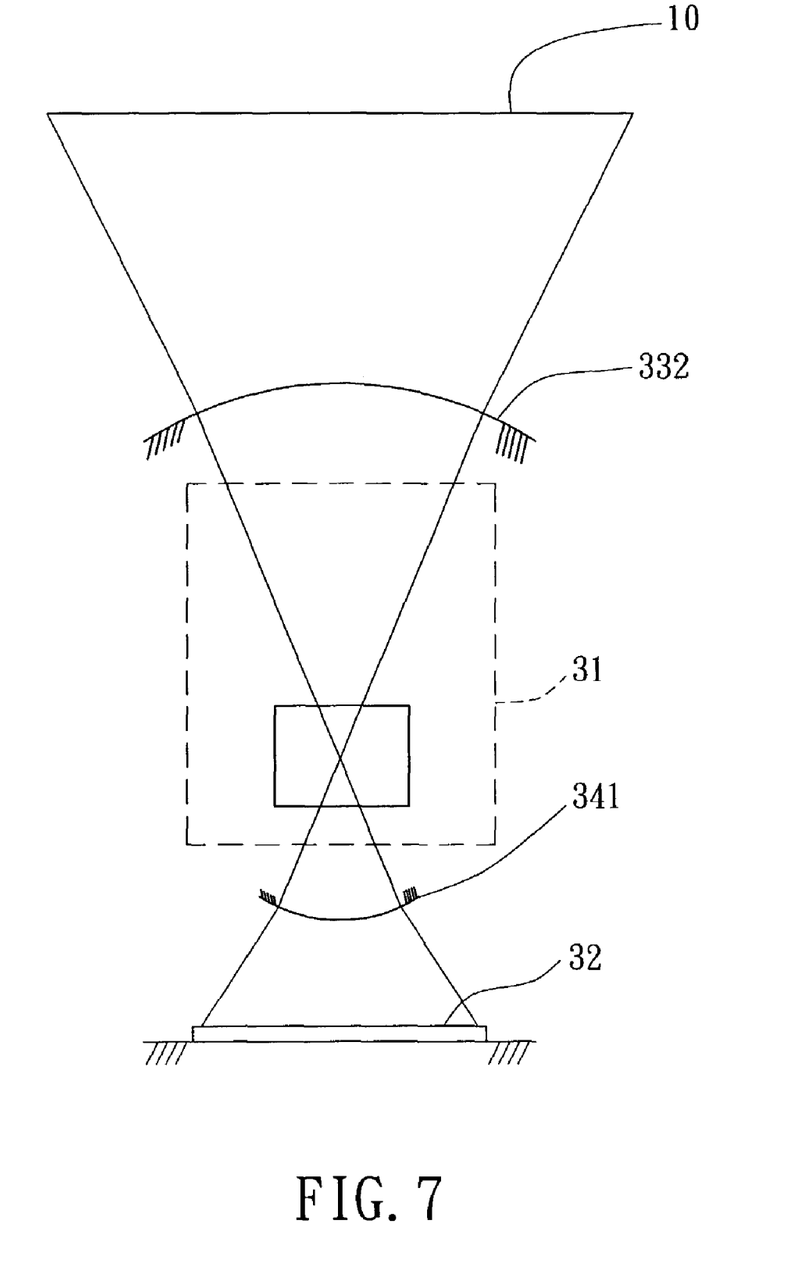
FIG. 7 is a fifth preferable embodiment according to the invention.

Please refer to FIG. 7, which is the fifth preferable embodiment of the invention. As shown in FIG. 7, a curved-surface optical element 332 is designed to be disposed between the light-path module 31 and the photoelectric conversion device 32, and another curved-surface optical element 341 is designed to be disposed between the light-path module and the scanned object 10. In this design, the size between the light-path module 31 and the photoelectric conversion device 32 and the size between the light-path module 31 and the scanned object 10 may be adjusted simultaneously. In operation, the curved-surface optical element 332 may converge the image to make the photo-image of the scanned object 10 prior to irradiating the image through the light-path module 31, and the curved-surface optical element 341 may disperse the image coming from the light-path module 31 before being processed by a photoelectric conversion in the photoelectric conversion device 32. By changing the positions of the curved-surface optical elements 332, 341 in the light-path route, the entire light-path route may be adjusted to reach a desired magnification ratio. In particular, the length of the entire light-path route may be shortened. Furthermore, the size and volumes of the light-path device and the entire optical scanner may be reduced, resulting in a relative savings in cost while still providing an effective scanning design. The light-path route summarized from FIG. 3 and FIG. 7 is described sequentially as the following: light-source device (light source 30)=>object 10=>curved-surface optical element (curved-surface optical element 332)=>reflection device (reflection mirrors 311, 312, 313)=>light-focusing device (lens 314)=>curved-surface optical element (curved-surface optical element 341)=>photoelectric conversion device 32 (CCD).

Applied in embodiments of the invention, the curved-surface optical element positioned in and inter-related with the light-path device appropriately may be adjusted to reach a desired design of a magnification ratio. By arranging the curved-surface optical element between the scanned document and the light-path module, it may magnify the scanned image and further shorten the required distance between the scanned object and the light-path module. Additionally, the curved-surface optical element designed between the light-path module and the photoelectric conversion device may shrink the scanned image and further reduce the required distance between the light-path module and the photoelectric conversion device.

What is claimed is:

1. An optical scanning device, comprising:
   a light source configured to transmit light toward an object to be scanned;
   a light path module including a plurality of reflection devices, the light path module configured to direct the light transmitted from the light source after the light has reflected off the object to be scanned;
   a photoelectric conversion device configured to receive the light directed by the light path module; and
   a first curved surface optical component positioned between the object to be scanned and the light path module and a second curved surface optical component positioned between the light path module and the photoelectric conversion device, the optical components having light transmissive surfaces.

2. The optical scanning device of claim 1, wherein the first curved surface optical component is positioned to focus received light and the second curved surface optical component is positioned to magnify received light.

3. The optical scanning device of claim 2, wherein the first curved surface optical component includes a convex curved surface oriented toward the light reflected off the object to be scanned.

4. The optical scanning device of claim 2, wherein the first curved surface optical component includes a concave curved surface oriented toward the light reflected off the object to be scanned.

5. The optical scanning device of claim 1, further comprising a lens arranged between the second curved surface optical component and the light path module.

6. The optical scanning device of claim 5, wherein the first curved surface optical component is positioned to focus received light, and the lens and the second curved surface optical component are each positioned to magnify received light.

7. The optical scanning device of claim 5, wherein the second curved surface optical component includes a concave curved surface oriented toward the lens.

8. The optical scanning device of claim 1, wherein the plurality of reflection devices includes a plurality of reflection mirrors, and wherein the light path module includes a lens.

9. The optical scanning device of claim 1, wherein the photoelectric conversion device includes a charge-coupled device configured to convert the light reflected off the object to be scanned into an electric signal.

10. The optical scanning device of claim 1, wherein the first curved surface optical component is configured to alter a length of a light path route from the light source to the photoelectric conversion device.

11. The optical scanning device of claim 1, wherein the light path module includes a lens.

12. The optical scanning device of claim 1, wherein the second curved surface optical component is a light focusing device.

13. An optical scanning device, comprising:
means for transmitting light toward an object to be scanned;
means for directing a light path route of the transmitted light after the transmitted light has reflected off the object to be scanned;
means for receiving the directed transmitted light and converting the light to an electric signal; and
means for altering a length of the light path route, the altering means including a means for focusing received light and a means for magnifying received light;
wherein the focusing means is positioned between the object to be scanned and the means for directing the light path route of the transmitted light.

14. The optical scanning device of claim 13, wherein the focusing means is positioned between the directing means and the magnifying means.

15. The optical scanning device of claim 13, wherein the means for directing the light path route of the transmitted light comprises means for reflecting the transmitted light and means for focusing the transmitted light.

16. The optical scanning device of claim 13, wherein the altering means comprises means for converging the transmitted light reflected off the object to be scanned.

17. An optical scanning device, comprising:
a light source configured to transmit light toward an object to be scanned;
a light path module including at least one reflection device and a light-focusing device, the light path module configured to direct the light transmitted from the light source after the light has reflected off the object to be scanned;
a photoelectric conversion device configured to receive the light directed by the light path module; and
a curved surface optical element external to the light path module and arranged in an optical path between the object to be scanned and the photoelectric conversion device;
wherein the curved surface optical element includes a first curved surface optical component positioned between the object to be scanned and the light path module, and a second curved surface optical component positioned between the light-focusing device of the light path module and the photoelectric conversion device.

18. The optical scanning device of claim 17, wherein the first curved surface optical component is adjustable to alter a length of a light path route from the light source to the photoelectric conversion device.

19. The optical scanning device of claim 17, wherein the first curved surface optical component is configured to converge the transmitted light reflected off the object to be scanned, and the second curved surface optical component is configured to disperse the light directed by the light path module.

20. An optical scanning device, comprising:
a light source configured to transmit light toward an object to be scanned;
a light path module including a plurality of mirrors and a lens, wherein the plurality of mirrors directs light reflected off the object along a predetermined light path length, and wherein the lens focuses the reflected light from the plurality of mirrors into an image;
a photoelectric conversion device configured to receive the light focused by the lens of the light path module; and
a curved surface optical element arranged between the object to be scanned and the photoelectric conversion device, wherein the curved surface optical element is configured to alter the predetermined light path length to modify an image magnification ratio of the image focused on the photoelectric conversion device;
wherein the curved surface optical element comprises a first curved surface optical component positioned between the object to be scanned and the light path module, and a second curved surface optical component positioned between the light path module and the photoelectric conversion device.

21. The optical scanning device of claim 20, wherein the first curved surface optical component includes a convex curved surface.

22. The optical scanning device of claim 20, wherein the first curved surface optical component includes a concave curved surface.

23. The optical scanning device of claim 20, wherein the first curved surface optical component is configured to converge the light reflected off the object, and wherein the second curved surface optical component is configured to disperse the light reflected off the object.

* * * * *